United States Patent [19]

Kine

[11] 3,915,028

[45] Oct. 28, 1975

[54] CYCLE BRAKE OPERATING DEVICE

[75] Inventor: Masayoshi Kine, Sakai, Japan

[73] Assignee: Shimano Industrial Company Limited, Sakai, Japan

[22] Filed: July 11, 1974

[21] Appl. No.: 487,669

[30] Foreign Application Priority Data

July 18, 1973  Japan.......................... 48-86775[U]
June 3, 1974  Japan.......................... 49-64475[U]
June 3, 1974  Japan.......................... 49-64476[U]

[52] U.S. Cl................................. 74/480 R; 74/489
[51] Int. Cl.² ........................................ G05G 11/00
[58] Field of Search.......... 74/523, 488, 480 R, 489, 74/494, 496

[56] References Cited
UNITED STATES PATENTS 3,403,577  10/1968  Ozaki..................................... 74/480

*Primary Examiner*—Samuel Scott
*Assistant Examiner*—Frank H. McKenzie, Jr.
*Attorney, Agent, or Firm*—Stevens, Davis, Miller & Mosher

[57] ABSTRACT

A brake operating device adapted to a bicycle drop type handle bar comprising a straight rod section and a bent rod section, which is composed of a main lever operable by a rider's hand gripping the bent rod section and an auxiliary lever operable when gripping the straight rod section, and the auxiliary lever is provided at the head thereof with a U-shaped fitting portion. The fitting portion is wrapped over a foremost end portion of the main lever, and a pin is inserted through the foremost end portion of the main lever and opposite side walls of the fitting portion of the auxiliary lever, thereby rigidly fixing the auxiliary lever to the main lever.

9 Claims, 10 Drawing Figures

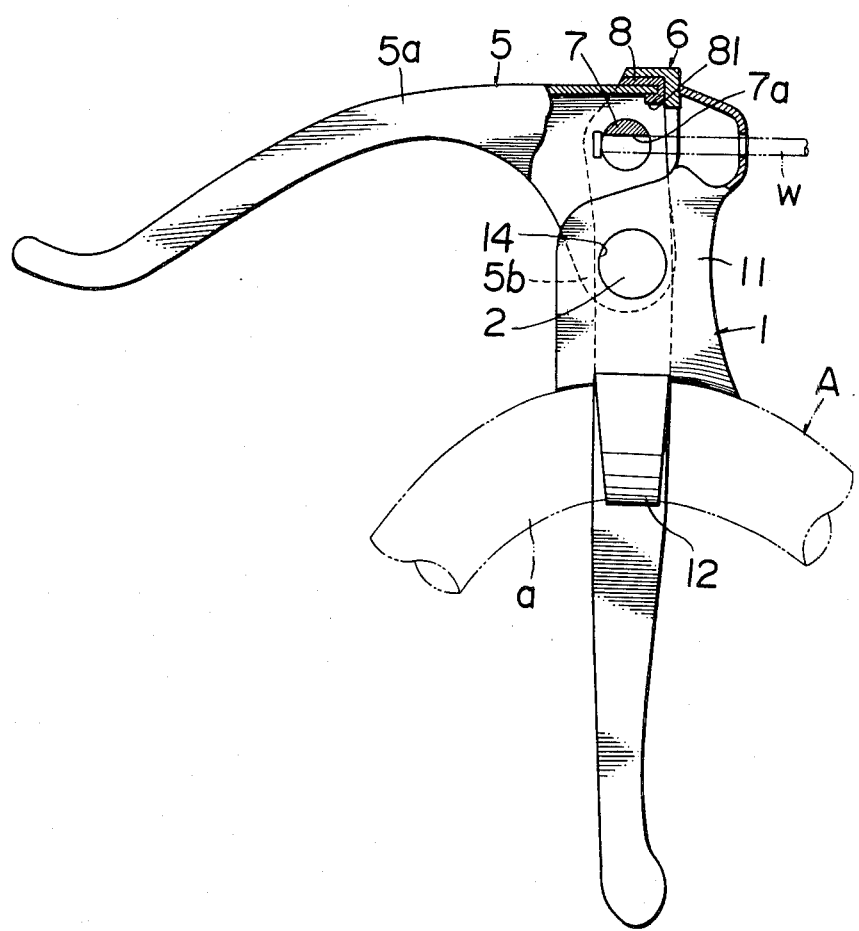

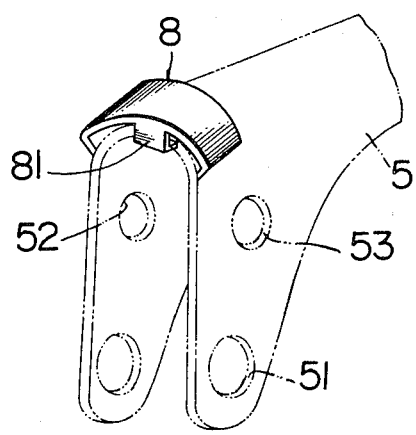
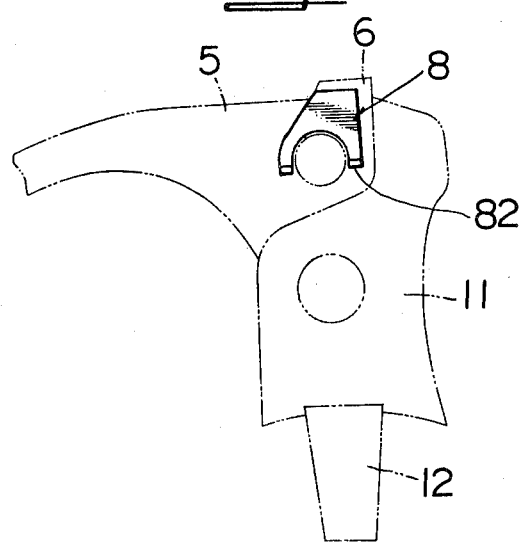

CYCLE BAKE OPERATING DEVICE

This invention relates to a brake operating device which is fitted to a handle bar of a bicycle, and more particularly to a brake operating device which is adapted to a drop type handle bar comprising a straight rod section and substantially U-shaped bent rod sections extending forwardly and downwardly from both ends of the straight rod section.

Conventionally, a well known brake operating device for a bicycle of such a drop type handle bar is, beside a usual brake lever, provided with an auxiliary lever having sections substantially parallel to the straight rod section and the bent rod section respectively, thus a rider can operate the brake by hands gripping the handle bar at the position of either the straight rod section or the bent rod section.

The provision of the auxiliary lever is well known as is indicated in British Pat. No. 778,809 and U.S. Pat. No. 3,403,577, namely, the former teaches an auxiliary lever fixed to one side of a main lever body by means of a screw bolt and the latter shows that an auxiliary lever is pivotally supported to one side of a main lever by utilizing the head of a shaft which rotatably pivotally supports the main lever and that the auxiliary lever is made co-operable at the head portion thereof with the main lever.

However, in the former case of using a screw bolt there is such a defect that the junction of both levers becomes weak and also brake operation by the auxiliary lever applies the eccentric force on the main lever to cause torsion on the pivot thereof resulting in making brake action unsmooth. In the latter case the problem is that the increase of required parts makes the construction complicated so that the assembly may be troublesome.

This invention has been designed to solve the problem in conventional prior art. A main object of the invention is the provision of a bicycle brake operating device which is simple in construction and capable of rigidly connecting an auxiliary lever to a main lever. Another object of the invention is the provision of a bicycle brake operating device which requires a few parts so as to make the assembly easy and the manufacturing cost low. Still another object of the invention is the provision of a bicycle brake operating device in which an auxiliary lever is rigidly fixed to a main lever without being rackety while using only a pin for connecting both levers with each other.

The invention is directed to fix an auxiliary lever to a main lever not at one side surface but at both side surfaces of the main lever. First, the invention is characterized in that the head of an auxiliary lever is formed in a U-shape corresponding to the foremost end of a main lever so as to be wrapped over the latter and a pin is inserted through holes formed at side walls of both levers whereby insertion of the pin permits the auxiliary lever to be secured to the main lever, secondly that the abovementioned pin serves both for retaining a control cable for braking and fixing the auxiliary lever to the main lever due to use of a retaining pin for retaining a terminal of the control cable, and thirdly that the abovementioned pin fixes the auxiliary lever to the main lever in so stable a condition that the latter is urged toward the inner surface of one side wall of the U-shaped fitting portion of the former, and further forthly that between the the inner surface of the auxiliary lever and the outer surface of the main lever a resilient member is inserted for spacing both levers thereby making it possible to stably fix the auxiliary lever to the main lever.

The aforedescribed objects and characteristics of the invention will be apparent from the embodiment and the novel features thereof which are pointed out with the annexed claims in connection with the accompanying drawings, in which:

Figure 3:
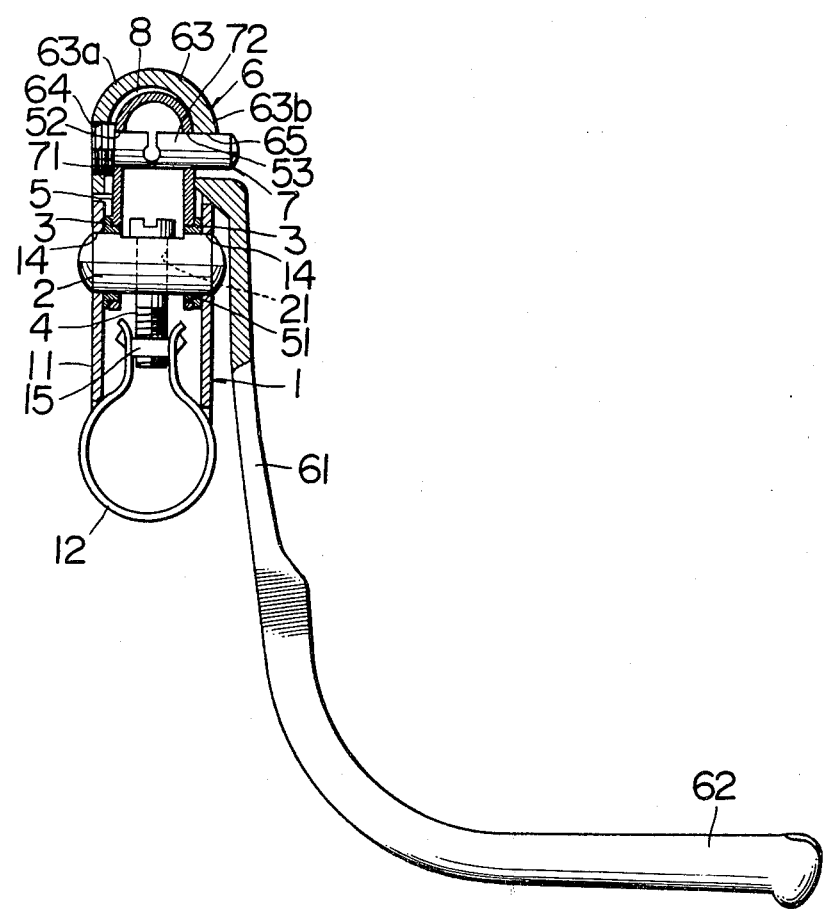
Figure 4:
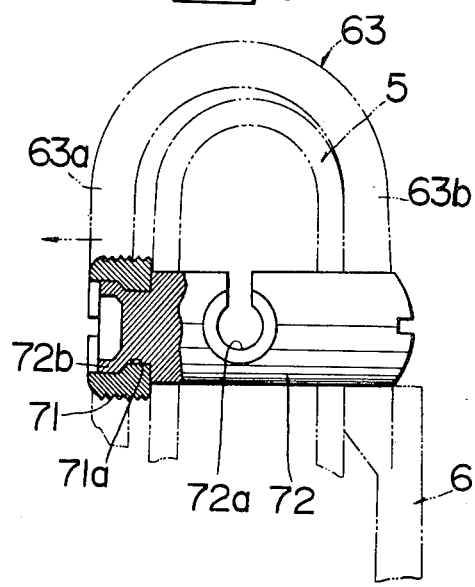
Figure 5:
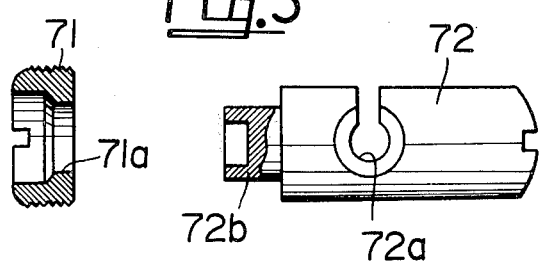
Figure 9:
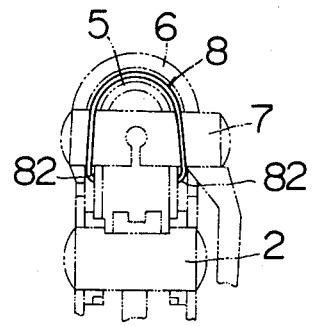
Figure 10:
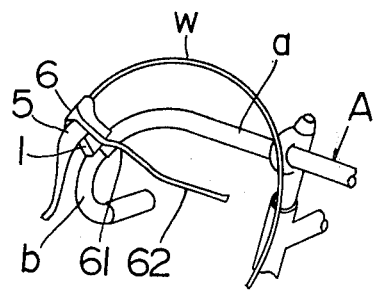

FIG. 3 is a longitudinally sectional view of a modified embodiment of the invention, FIG. 4 is a partially diagrammatic sectional view thereof showing a principal portion for fixing an auxiliary lever, FIG. 5 is an exploded view of an unfinished pin, FIG. 6 is a partially cutaway side view of another modified embodiment, FIG. 7 is perspective view of a resilient member in a principal portion of the embodiment in FIG. 6, FIG. 8 is a side view of a modified embodiment of the resilient member, FIG. 9 is an elevational view thereof, and FIG. 10 is a partly schematic perspective view showing a drop handle bar provided with a brake operating device in accordance with the invention.

Figure 1:
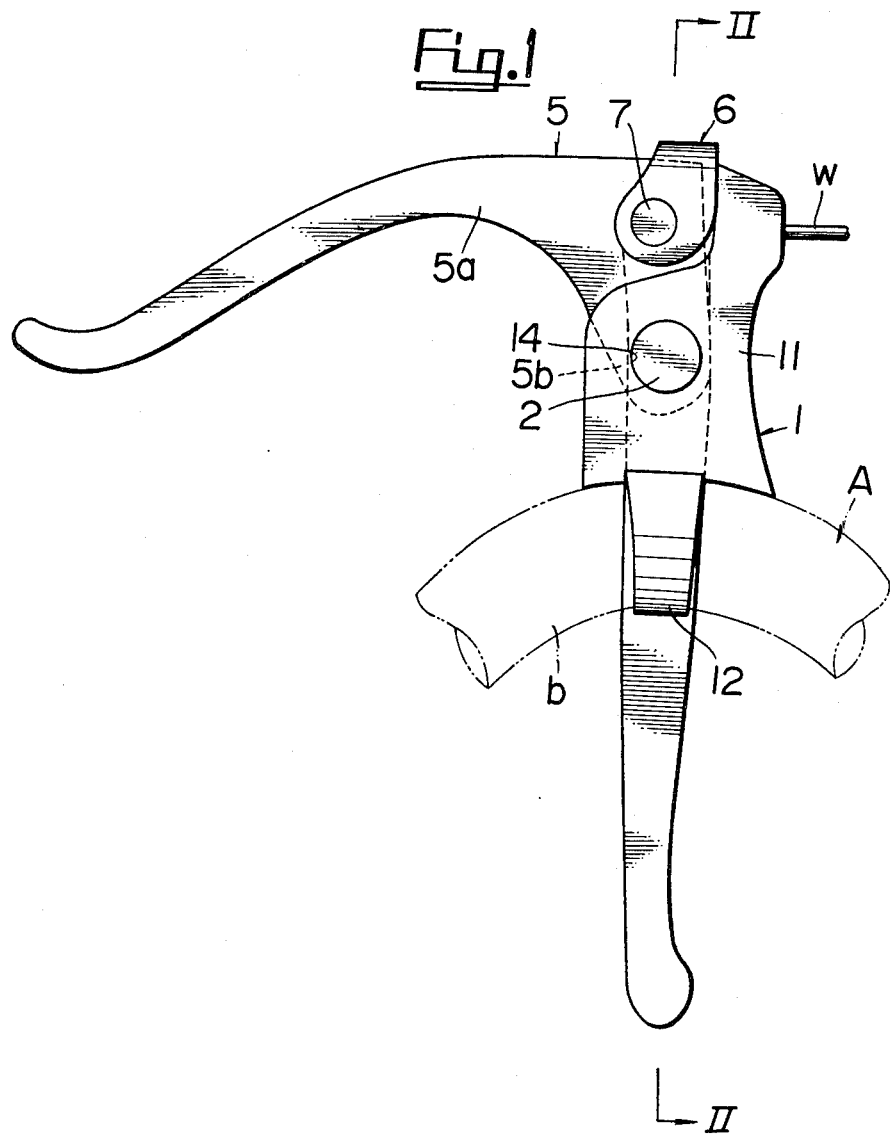
FIG. 1 is a side view of an embodiment of the invention.
Figure 2:
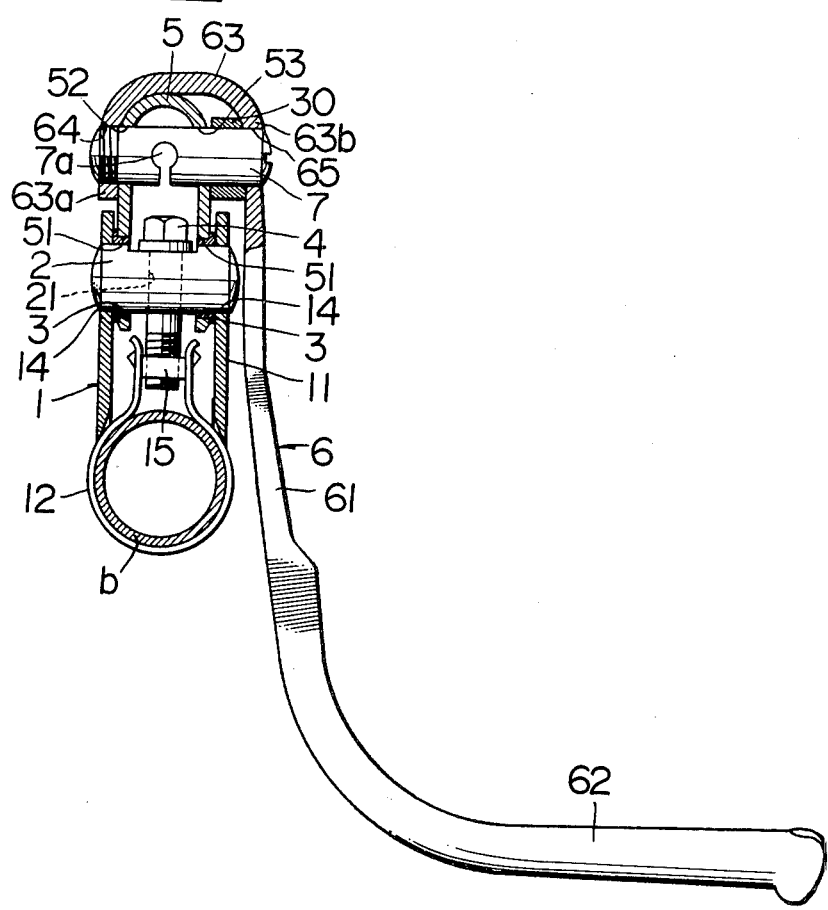
FIG. 2 is a sectional view taken on line II—II in FIG. 1.

Referring to the drawings, in FIGS. 1 and 2 the reference numeral 1 designates a bracket member which is, as shown in FIG. 10, fixed to a bent rod section $b$ of a drop type handle bar A comprising a straight rod section $a$ and a U-shaped bent rod section $b$ extending forwardly and downwardly from both ends of the straight section. The bracket member 1 comprises a main body 11 of a metallic plate formed in a substantially square prism-shape and a clip band 12 for securing the main body 11 onto the bent rod portion $b$.

The main body 11 is provided forwardly and upwardly thereof with a hole through which a control cable $w$ is inserted and also is provided at opposite side walls thereof with two holes 14, 14 which are oppositely perforated therethrough at a portion slightly upper from the center thereof, through which holes a shaft 2 is inserted to be fixedly supported with the main body.

At the center of the shaft 2 a hole 21 is perforated therethrough rectangularly to the axis of the shaft, through which a bolt 4 is inserted for being screwably engaged with a washer 15 retained to the clip band 12 at the upper portion thereof.

Accordingly, the bracket member 1 is fixed to the bent rod section $b$ in a manner that the clip band 12 which is positioned forwardly of the bent rod section $b$ is raised through the washer 15 by tightening the bolt 4 at the same time the main body 11 is lowered to result in securing the bracket member 1 at a position forward and upward of the bent section $b$.

The reference numeral 5 designates a main lever which is formed of a metallic plate bent in a U-shape. The main lever 5 has, as is well known, a grip 5a and a pivotal support 5b, which pivotal support 5b is provided at the lower portion thereof with shaft holes 51, 51 and also at the upper portion thereof with holes 52 and 53 for inserting a pin as described hereinafter. Shaft holes 51, 51 are provided with synthetic resin bushings 3, 3 respectively, into which the shaft 2 is inserted through the bushings whereby insertion of the shaft 2 makes the main lever 5 pivotally supported in a rotatable relation with the bracket member 1.

The reference numeral 6 designates an auxiliary lever which has a section 61 substantially parallel to the bent rod section b of the drop handle bar A and a section 62 substantially parallel to the straight rod section a of the same, and is as a whole formed substantially in a L-shape. The lever is provided at the head thereof with a fitting portion 63 bent in a U-shape so as to be formed correspondingly to the U-shaped external formation of the main lever 5. The fitting portion 63 is provided at opposite side walls 63a, 63b with holes 64 and 65 at least one of the two holes being threaded for inserting a pin thereinto. Now, the fitting portion 63 is wrapped over the foremost end portion of the main lever so that the inner surface of the former may be fitted to the outer surface of the latter, and into the holes 64, 65 and 52, 53 are inserted a pin 7 having a screw thread at one end thereof. Thereafter, the threaded end portion of the pin 7 is screwably engaged with the threaded hole 64 thereby mounting the auxiliary lever onto the main lever 5.

The pin 7 is, as shown in FIG. 2, slightly longer than the interval between outer surfaces of opposite side walls of the fitting portion 63 of the auxiliary lever, diametrically insertible into the holes 52, 53, 64 and 65, and mainly applied with a check pin for retaining a terminal of the control cable w. Incidentally, a widely known fixing pin as well as the above check pin is available. The use of the check pin as the abovementioned, serves both as retaining a terminal of the control cable w and fixing the auxiliary lever 6, thereby becoming economical due to reduction of numbers of necessary parts.

Namely, the pin 7 is provided at the center thereof with a key-shaped hole 7a for receiving a projection attached to the terminal of control cable w so as to be retained to the pin 7, thus being available for retaining the cable and fixing the auxiliary lever to the main lever with the pin 7 only.

In the aforegoing construction, in case turning of the auxiliary lever 6 is hindered due to contact of the auxiliary lever 6 with the lateral surface of bracket member 1, it may be proper, as shown in FIG. 2, to make larger a spaced interval between opposite walls 63a and 63b of the hitting portion 63 of the auxiliary lever 6. For this purpose, an annular spacer 30 is applicable to be inserted between the outer surface of one side wall of the main lever and the inner surface of the side wall of the fitting portion 63. The spacer being supported with the pin 7, is brought into contact at one side thereof with the outer lateral surface of the main lever and at the other side of the same with the inner surface of one side wall 63a of the fitting portion 63 respectively, thereby unrotatably fixing the auxiliary lever 6 to the main lever 5.

The spacer 30 has a length which is at least equal to the distance between such outer and inner surfaces, as shown in FIG. 2. The spacer is made of an elastically deformable member and, when not inserted between such surfaces, has an actual length which is greater than those surfaces.

A basic construction of the bicycle brake operating device in accordance with the invention has been described heretofore, namely, the auxiliary lever 6 can be fixed integrally of the main lever 5 through the pin 7 in a manner that opposite walls of the fitting portion interpose therebetween the main lever. In this case, the construction of pin 7 as shown in FIG. 4 or insertion of a resilient member 8 between the main lever 5 and the auxiliary lever 6 as shown in FIG. 7, makes it possible to fix the auxiliary lever to the main lever more rigidly.

Improvement of the fixing construction will be described in the following.

Referring to FIGS. 3 to 5, the pin 7 is, as is apparent in FIG. 4, composed of a portion 71 having a large diameter and a portion 72 having a small diameter. The portion 71 is provided at the outer periphery thereof with a screw thread and also the threaded insertion hole 64 is formed larger in a diameter than other holes 52, 53 of the main lever and the hole 65 of the auxiliary lever so as to be engageable with the larger diameter portion 71. Though portions 71 and 72 of the pin 7 may be made integrally with each other, it is preferred to mutually rotatably connect these portions 71 and 72 which are previously separately built up. This connection is, as shown in FIG. 5, carried out in that at the connecting end of the portion 72 of a small diameter is provided a protrusion 72b having a cylindrically shaped head while the portion 71 of a large diameter is provided with a through bore 71a to receive the protrusion 72b, the cylindrically shaped portion of the protrusion 72b being radially enlarged as is shown in FIG. 4 to form an integrally finished pin.

The abovementioned rotatable connection of both portions 71 and 72, becomes effective in provision of the key-shaped control-cable-retaining hole 7a at the portion 72 of a small diameter, the reason of which is that when the auxiliary lever 6 is fixed to the main lever by screwably engaging the portion 71 with the threaded hole 64 the portion 72 of a small diameter is adjustable by turning it to whatever position is to be occupied by the retaining hole 7a so that the turn of the portion 72 permits the portion 71 of a large diameter to be screwably engageable with the portion 71 irrespectively of the location of the hole 7a, thereby making it possible to fix the auxiliary lever to the main lever more rigidly.

The check pin 7 constituted as the aforegoing, is inserted through holes 64, 65 and 52, 53 so that the threaded portion 71 of the pin is screwably engaged with the threaded hole 64, whereby the shoulder of portion 71 comes in contact with the outer surface of the main lever 5 so as to allow the auxiliary lever 6 to move in a direction of the arrow shown in FIG. 4, namely, in the reverse direction of a forward screw motion of the portion 71 with respect to the main lever 6, thus making the inner surface of the wall 63b of the fitting portion 63 of the auxiliary lever 6 come closely into contact with the outer surface of one side wall of the main lever 5.

Accordingly, the auxiliary lever 6 can be rigidly fixed to the main lever 5 without occurrence of any rattle therebetween.

Next, referring to FIGS. 6 to 9, the construction is that between opposite walls at the curved portions of the foremost end of the main lever 5 and the fitting portion 63 of the auxiliary lever 6 respectively is insertibly mounted a resilient member 8 which is mainly made of a metallic leaf spring. The resilient member 8 is formed of a curved leaf spring having a radius of curvature larger than that of a semi-circular inner surface of the fitting portion 63 of the auxiliary lever 6 and also is, as shown in FIG. 7, provided at the center of the curved portion thereof with a hook lug 81 for being temporarily hooked onto the the foremost end of the main lever 5. Prior to wrapping the auxiliary lever 6 over the main lever 5, the resilient member 8 is temporarily hooked to the foremost end of the main lever 5, thereafter, the wrapping of the auxiliary lever 6 and the main lever 5 permits the resilient member to be brought into contact at both edges in the transverse direction thereof with the inner surfaces of opposite side walls of the lever 6 so that the resilient member becomes elastically deformed to be attached to the main lever 5. The auxiliary lever 6 is, in the screwable engagement of pin 7, urged away from the main lever 5 for making holes 64, 65 and 52, 53 come closely in contact with the periphery of the pin 7 respectively, thereby eliminating looseness between the holes and the pin.

Besides the abovementioned construction, the resilient member 8 may be formed as a whole in a U-shape and attached to the main lever in a manner that each idle end thereof is inwardly bent at 82 to embrace the outer surfaces of the opposite side walls of the main lever. Incidentally, a coil spring is available in place of leaf spring and the same effect as the above is obtainable by use of a resilient material for the spacer 30 indicated in FIG. 2.

The brake operating device in accordance with the invention is constructed as the aforementioned and applied to a bicycle as shown in FIG. 10. Namely, when a rider tries to actuate the brake of a bicycle running at a low speed while gripping by hands a straight rod section *a* of a drop type handle bar, his fingers can reach from his hand at the above mentioned position for gripping the portion 62 of the auxiliary lever 6 which is substantially parallel and close to the straight rod section *a*. At this time, since the auxiliary lever 6 is fixed to the main lever 5 through the pin 7, the main lever 5 turns around the shaft 2 to cause braking action by stretching the control cable *w* retained at the terminal thereof to the key-shaped hole 7*a*.

When a rider actuates the brake of a bicycle running at a medium speed while gripping a handle bar adjacent to the bracket member 1, his fingers can reach from his hand the section 61 of the auxiliary lever 6 substantially parallel and close to the bent rod section *b* of the handle bar. At this time, the main lever 5 turns, correspondingly to the above mentioned, to actuate the brake.

Further, when a rider tries to actuate the brake when riding at a high speed while he grips the handle bar at the lower portion of the bent rod section *b*, he can stretch his fingers to grip the main lever 5 together with the bent rod section *b* of the handle bar, thereby to exert braking action.

As is clearly understood from the aforementioned description, the brake operating device in accordance with the present invention enables a rider to actuate the brake by gripping the main lever or the auxiliary lever by stretching his fingers while gripping the handle bar at any position thereof with the bicycle running at any speed low, medium or high, thereby making it possible to ride a bicycle in safety by means of an extremely simple brake operation. In addition, the auxiliary lever is provided at the head thereof with a U-shaped fitting portion and fixed to the main lever with a check pin, which is capable of being simply constituted and also subjected to no torsion from operation of the lever due to fixing the auxiliary lever to the main lever in a stable state. Furthermore, employing a check pin formed to retain a terminal of a control cable therewith, makes it possible to reduce the number of parts, lessen assembly processes and decrease the price of this brake operating device.

Still further, the threaded screw portion of the pin is screwably engaged with the threaded hole of the fitting portion of the lever so that the inner surface the fitting portion of the head of the auxiliary lever is brought closely into contact with the outer surface of the main lever, or a resilient member is inserted between the main lever and the auxiliary lever, whereby the abovementioned fixing of the main lever and the auxiliary lever becomes exact, rigid and entirely not rickety to result in securing the latter in a stable condition.

It is to be understood that the invention is not limited in a particular construction of a preferred embodiment described herein and it is intended that all matters contained in the above description or shown in the accompanying drawings shall be interpreted as merely illustrating and not limiting the invention.

What is claimed is:

1. A brake operating device adapted to be mounted to a bicycle drop type handle bar having a straight rod section and a substantially U-shaped bent rod section extending downwardly and forwardly from an end of said straight rod section, comprising:
   a. a bracket member which is secured to said bent rod section,
   b. a main lever which is rotatably mounted on said bracket member and has two side walls, said main lever having at a foremost end thereof first holes which are located transversely of said main lever through both said side walls thereof,
   c. an auxiliary lever which is fixed to said main lever, said auxiliary lever having portions substantially parallel to the straight rod section and the bent rod section respectively and being provided at a head thereof with a U-shaped fitting portion which is wrapped over the outer surface of the foremost end of said main level, said fitting portion being provided at opposite side walls thereof with second holes, and
   d. a fixing pin which is slightly longer than the spaced interval between said side walls of said auxiliary lever and is located in said first and second holes for fixing said auxiliary lever to said main lever when said fitting portion of the auxiliary lever is wrapped over the outer surface of said foremost end of the main lever for permitting said first and second holes to coincide with each other.

2. The brake operating device according to claim 1, wherein said fixing pin comprises means for retaining a terminal of a control cable for operating a bicycle brake.

3. The brake operating device according to claim 1, wherein said fixing pin is provided with a screw thread on at least one end in a longitudinal direction thereof and at least one of said second holes of said fitting portion of the auxiliary lever is a threaded hole into which the fixing pin is inserted, said threaded hole being screwably engaged with said threaded end of the pin for fixedly connecting said main and auxiliary levers to each other.

4. The brake operating device according to claim 1, wherein said fixing pin is formed of two portions one of which has a large diameter and a screw thread at the outer periphery thereof and the other of which has a diameter smaller than that of said large diameter portion, one of said second holes of the fitting portion of said auxiliary lever being larger in diameter than said first holes of the main lever and having a screw thread, said one of said second holes having the screw thread being engaged with said screw thread of the large diameter portion so that said large diameter portion permits the outer surface of one said wall of said main lever to be brought closely into contact with the inner surface of one side wall of said fitting portion, thereby rigidly fixing the auxiliary lever to the main lever.

5. The brake operating device according to claim 4, wherein said fixing pin is provided at the center of the smaller diameter portion with a hole for retaining a terminal of a control cable and wherein said smaller diameter portion is rotatably attached to said large diameter portion.

6. The brake operating device according to claim 1, wherein between the outer surface of the foremost end of said main lever and the inner surface of said fitting portion of the auxiliary lever which is secured to said main lever is provided a resilient member urging both levers to be kept apart from each other.

7. The brake operating device according to claim 6, wherein said resilient member is formed of a metallic leaf spring.

8. A brake operating device adapted to be mounted to a bicycle drop type handle bar having a straight rod section and a substantially U-shaped bent rod section extending downwardly and forwardly from both ends of said straight rod section, comprising:
  a. a bracket member which is secured to said bent rod section,
  b. a main lever which is rotatably mounted on said bracket member and has two side walls, said main lever having at the foremost end thereof first holes which are located transversely of said main lever through both said side walls thereof,
  c. an auxiliary lever which is fixed to said main lever, said lever having portions substantially parallel to the straight rod section and the bent rod section respectively and being porvided at a head thereof with a U-shaped fitting portion which is wrapped over the outer surface of the foremost end of said main lever, said fitting portion being provided at opposite side walls thereof with second holes, said U-shaped fitting portion having said opposite side walls spaced apart slightly larger than the width of said bracket member, and
  d. a fixing pin which is slightly longer than the spaced interval between said side walls of said auxiliary lever and is located in said first and second holes for fixing said auxiliary lever to said main lever when said fitting portion of the auxiliary lever is wrapped over the outer surface of said foremost end of the main lever for permitting said first and second holes to coincide with each other, and
  e. a spacer which is inserted between the outer surface of said foremost end of the main lever and the inner surface of said fitting portion of the auxiliary lever which face one another, said spacer having a length which is at least equal to the distance between the outer and inner surfaces which face each other.

9. The brake operating device according to claim 8, wherein said spacer includes an elastically deformable material and has an actual length greater than the distance between the outer and inner surfaces which face each other when not inserted between these surfaces.

* * * * *